(12) United States Patent
Roosendaal et al.

(10) Patent No.: US 7,755,707 B2
(45) Date of Patent: Jul. 13, 2010

(54) DISPLAY DEVICE

(75) Inventors: Sander J. Roosendaal, Geldrop (NL); Cornelis Van Berkel, Hove (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 667 days.

(21) Appl. No.: 11/719,779

(22) PCT Filed: Nov. 7, 2005

(86) PCT No.: PCT/IB2005/053638

§ 371 (c)(1),
(2), (4) Date: May 21, 2007

(87) PCT Pub. No.: WO2006/056897

PCT Pub. Date: Jun. 1, 2006

(65) Prior Publication Data
US 2009/0147160 A1    Jun. 11, 2009

(30) Foreign Application Priority Data
Nov. 24, 2004   (EP)   ................. 04106025

(51) Int. Cl.
*G02F 1/1335* (2006.01)
(52) U.S. Cl. ...................................................... 349/15
(58) Field of Classification Search ................... 349/15
See application file for complete search history.

(56) References Cited

U.S. PATENT DOCUMENTS

| 6,034,756 | A | 3/2000 | Yuan et al. |
| 6,046,787 | A | 4/2000 | Nishiguchi |
| 6,055,103 | A | 4/2000 | Woodgate et al. |
| 6,069,650 | A | 5/2000 | Battersby |
| 7,532,272 | B2 * | 5/2009 | Woodgate et al. ............. 349/95 |
| 2004/0125323 | A1 | 7/2004 | Park et al. |
| 2004/0156002 | A1 | 8/2004 | Suzuki et al. |
| 2004/0240777 | A1 * | 12/2004 | Woodgate et al. ............. 385/16 |

FOREIGN PATENT DOCUMENTS

| WO | WO03/015424 A2 | 2/2003 |
| WO | WO2004/070467 A2 | 8/2004 |

* cited by examiner

*Primary Examiner*—James A Dudek
(74) *Attorney, Agent, or Firm*—Larry Liberchuk

(57) ABSTRACT

The present invention relates to a display device with a birefringent lens system having cylindrical lenses, extending in a main direction. The polarization of light modulated by a LC layer is twisted by a rotator layer (25') in order to be perpendicular or parallel with this main direction. A birefringent compensation layer (26) is used to remove any ellipticity introduced by the rotator layer (25'). This provides improved contrast when the display device is used e.g. in a switchable 2D/3D display.

9 Claims, 2 Drawing Sheets

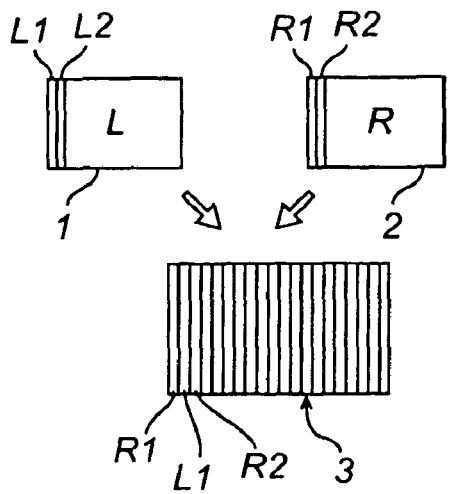
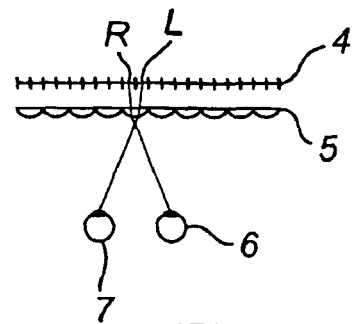
Fig. 1  Fig. 2
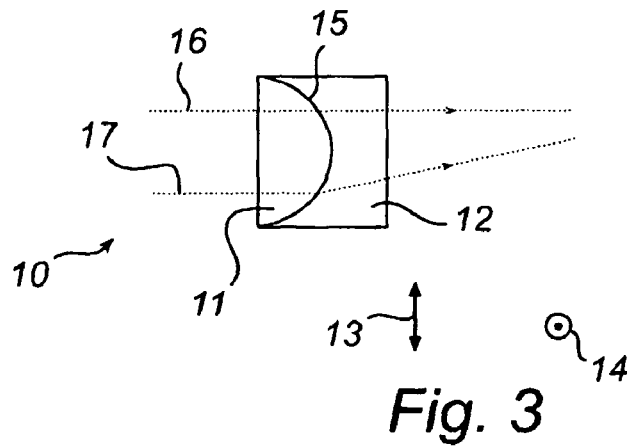
Fig. 3
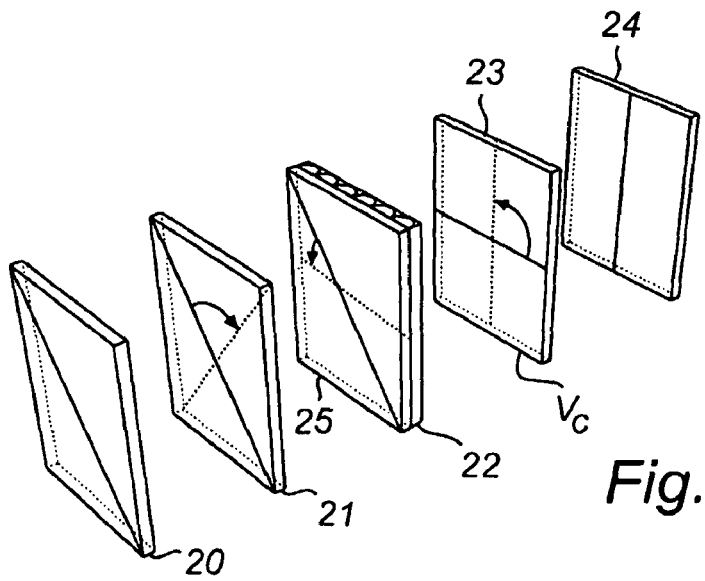
Fig. 4

DISPLAY DEVICE

FIELD OF THE INVENTION

The present invention relates to a display device comprising a controllable LC (liquid crystal) layer, a birefringent lens layer, comprising a number of cylindrical lenses, extending in a main direction, and a rotator layer providing a polarisation twist for rotating the polarisation direction of light rays, received from the LC layer, in such a way that it is parallel with or perpendicular to the main direction, the lens layer refracting said light rays differently depending on their direction of polarisation; and a switchable birefringent layer, receiving light rays from the lens layer and providing a variable amount of polarising twist to these rays in order to select an operation mode for the birefringent lens layer.

BACKGROUND OF THE INVENTION

Such a device is disclosed in WO, A2, 03/015424 and results in a display that is switchable between a 2D mode and a 3D mode. A rotator layer may be used to adapt commercially available controllable LC layers, which are often oriented at 45° and 135° azimutal angle to the main direction of the lens layer which is vertical (azimutal angle 90+/−10°) as seen from a user.

A problem with such a display is that the contrast ratio in either the 2D mode or the 3D mode is insufficient for many applications.

SUMMARY OF THE INVENTION

It is therefore an object of the present invention to provide a display device of the initially mentioned kind, where good contrast ratio characteristics can be achieved regardless of in which operation mode the lens layer is used.

This object is achieved by a display device according to claim 1.

More specifically the display device then comprises a controllable LC layer, a birefringent lens layer, comprising a number of cylindrical lenses, extending in a main direction, and a rotator layer providing a polarisation twist for rotating the polarisation direction of light rays, received from the LC layer, in such a way that it is parallel with or perpendicular to the main direction, the lens layer refracting said light rays differently depending on their direction of polarisation, and a switchable birefringent layer, receiving light rays from the lens layer and providing a variable amount of polarising twist to these rays in order to select an operation mode for the birefringent lens layer, wherein a birefringent compensation layer is placed between the birefringent lens layer and the switchable birefringent layer, the birefringent compensation layer providing a polarisation change that is substantially equal in amount and is opposite in direction as compared to the polarisation change of the rotator layer.

The added birefringent compensation layer provides a twist in the opposite direction as compared to the rotator layer, and has shown to compensate for any ellipticity introduced by the rotator layer in such a way that two layers, when taken together, provide a substantially improved contrast ratio for the display.

This effect may be provided by letting the retardation value of the birefringent compensation layer be substantially equal to the retardation value of the rotator layer.

Preferably, the polarisation twist of the birefringent compensation layer is substantially equal in amount with the polarisation twist of the rotator layer, but opposite in direction.

Preferably, the rear optical axis of the birefringent compensation layer is perpendicular to the front optical axis of the rotator layer.

In a preferred embodiment, also the retardation value of the switchable birefringent layer is substantially equal to the retardation value of the LC layer. This also provides an improved effect to the contrast ratio.

The polarisation twist of the switchable birefringent layer may also be substantially equal in amount with the polarisation twist of the LC layer, but opposite in direction.

The rear optical axis of the switchable birefringent layer may also be perpendicular to the front optical axis of the LC layer.

In an embodiment, the switchable birefringent layer may have a plurality of individually controllable sub-areas. This allows a mixed display mode, where one part of the display is in 2D and another part of the display is in 3D.

The display device may be used as a switchable 2D-3D display. Then the main direction is approximately vertical as seen from a user.

These and other aspects of the invention will be apparent from and elucidated with reference to the embodiments described hereinafter.

BRIEF DESCRIPTION OF THE DRAWINGS

FIG. 1 illustrates the generation of a composite image intended for an autostereoscopic display.

FIG. 2 illustrates an arrangement for projecting image information from such an image to the left and right eyes of a user.

FIG. 3 illustrates the working principle of a birefringent lens.

FIG. 4 illustrates schematically a switchable 2D/3D display according to prior art.

DESCRIPTION OF PREFERRED EMBODIMENTS

Figure 5:
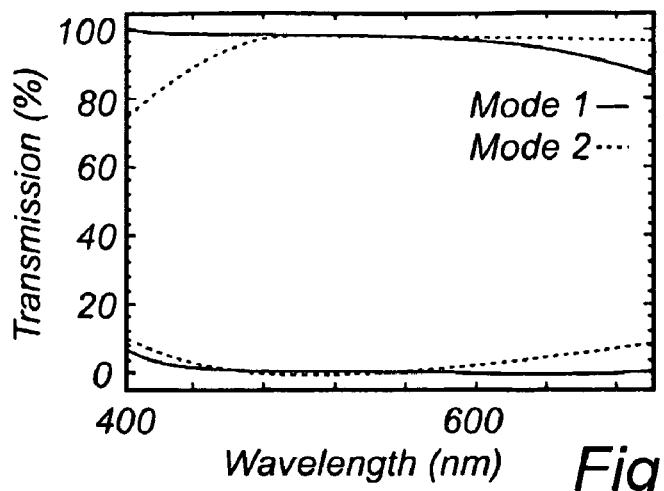
FIG. 5 illustrates simulated contrast ratio characteristics for the display of FIG. 4.

FIGS. 1 and 2 illustrate schematically a concept for obtaining an autostereoscopic image. By an autostereoscopic image is meant an image that to a user appears to be 3-dimensional, without the use of special glasses.

With reference to FIG. 1, a first image 1 is intended to be displayed to the left eye of a user, whereas a second image 2 is intended to be displayed to the fight eye of a user. Such images may be obtained e.g. by photographing an object with two offset cameras, much, like the human eyes. It is of course possible to obtain such images in many other ways.

From the first and second images 1, 2 a composite image 3 may be obtained by interleaving thin vertical slices L1, L2, etc.; R1, R2, etc. from the first and second images 1, 2 in an ordered manner (from left to right: leftmost slice from second image, leftmost slice from first image, second leftmost slice from second image etc.). The composite image may be displayed e.g. using a liquid crystal display (LCD).

FIG. 2 illustrates an arrangement for projecting such a composite image, displayed by a liquid crystal display 4, to a user's eyes 6, 7. The arrangement comprises a lens layer 5 including a plurality of juxtaposed, cylindrical plano-convex lenses. Each lens covers two slices R, L in the displayed composite image and serves to project light from a slice R towards the right eye 6 of a user, and light from a slice L towards the left eye 7 of a user. This resembles very much the concept used in so called "3D-Postcards", where the composite image is printed on paper and the lens layer comprises a moulded plastic sheet.

FIG. 3 illustrates, schematically with a cross-section, the working principle of a birefringent lens 10 that may be used in an embodiment of the invention. The lens 10 comprises first and second transparent materials 11, 12. The first material 11 is isotropic, which means that its refractive index $n_1$ is the same regardless of the polarisation direction of the light passing through the material. The second material 12 is instead birefringent, it has a first refractive index $n_2$ for light having a first polarisation direction 13, in the plane of the paper and a second refractive index $n_3$ for light having a second polarisation direction 14, normal to the plane of the paper. Alternatively, the first material 11 is birefringent and the second material 12 is isotropic. The interface 15 between the first and second materials 11, 12 is a curved surface, such that the first material 11 on its own constitutes a cylindrical, piano-convex lens.

If it is assumed that $n_1=n_2$ and $n_1>n_3$, a polarised light ray 16, passing through the lens and having the polarisation direction 13, will experience the same refractive index before and after the interface 15, and will hence not be refracted. A polarised light ray 17, having the polarisation direction 14 however will be refracted, as indicated in FIG. 3, since the refractive index before and after the interface 15 will be different. Thus, by changing the polarising direction of the light, it may be chosen whether the lens 10 should be active or not. Alternatively, a lens may be constructed with $n_1=n_2$ and $n_1<n_3$.

FIG. 4 illustrates schematically a 2D/3D display according to prior art. The display comprises the following layers. A rear polariser 20, polarising light from a backlighting arrangement (not shown) into a 45° azimutal angle. This light is modulated by a twisted nematic TFT (Thin Film Transistor) LC (Liquid Crystal) layer 21, having a plurality of pixels, which may apply a 90° polarisation twist to light passing therethrough.

Light from the TFT-LC layer 21 passes through a lens layer 22, functioning according to the principle discussed in connection with FIG. 3 and comprising a large number of cylindrical lenses oriented at the azimutal direction 90°, i.e. vertically as seen from a user. The lens layer 22 is followed by a switchable birefringent layer 23, which is able to switch between changing the polarisation of incoming light 90° or 0°. This layer may be devised as a nematic twist layer, e.g. with first and second transparent electrodes, each covering most of the layer surface. The amount of twist is changed as a response to a varied control voltage $V_c$, applied between the electrodes.

Essentially the lens layer 22 provides a lens functionality, similar to the lens layer 5 in FIG. 2, for one polarisation direction, but not for the other. The switchable birefringent layer 23 is able to switch the display from a normally bright (+90° twist) to a normally black mode (0°). Thus in the 2D mode, the switchable birefringent layer 23 may in an example provide a 90° twist, thereby making a front polariser (analyser) 24 block light that has been refracted by the lens layer 22. In the 3D mode, the switchable birefringent layer 23 may provide a 0° twist, thus causing light, that has not been refracted by the lens layer 22, to be blocked by the front polariser 24.

It is possible, according to an embodiment of the invention, to provide such a switchable birefringent layer 23 with two or more individually controlled sub-areas (each being controlled with a separate control voltage, applied between separate electrodes). This allows the use of a mixed mode, where a part of the display, for instance the upper half, functions as a 2D display whereas another part, for instance the lower half, at the same time functions as a 3D display.

Note that the TFT LC layer should receive inverted signals in the 3D mode compared to in the 2D mode, since in one of these modes the display is normally black, while in the other it is normally bright. Which mode is normally bright and which is normally black depends on the orientation of the birefringent material in the lens layer 22.

If a mixed mode is used in the switchable birefringent layer 23, this should of course also apply to the TFT LC layer.

The lenses of the lens layer 22 are oriented in the vertical direction and therefore light reaching the interface between the isotropic and anisotropic materials in the lens layer should be polarised at either 0° or 90° in azimutal direction in case of black and white pixels. For grey levels different polarisation states are possible. Since most available TFT LC layers 21 are oriented at 45° or 135°, a rotator layer 25 is provided between the TFT LC layer 21 and the lens layer 22.

The introduction of this rotator layer 25 however entails degraded contrast ratio in either the normally black mode or the normally bright mode.

The reason for this is that the waveguiding of a twisted birefringent structure such as this rotator cannot be entirely perfect over the visible spectrum. A good rotator is obtained for the Gooch-Tarry maximum:

$$\frac{d\Delta n}{\lambda} = \sqrt{\left(\frac{N}{2}\right)^2 - \left(\frac{\varphi}{\pi}\right)^2},$$

where $N=1, 2, 3, 4, \ldots$, $\lambda$ is the wavelength, $\Delta n$ is the birefringence, d is the birefringent material thickness and $\varphi$ is the twist angle. As is evident, this condition can only be met for one wavelength. Usually $\lambda=550$ nm is chosen, and the lower the value of $d\Delta n/\lambda$, the better the condition is met for other visible wavelengths, and the lower the wavelength dependence of the dark and bright states.

In a simulation of an arrangement as illustrated in FIG. 4, N=1 was thus chosen for the rotator layer 25 (45° twist), and N=2 was chosen for the TFT LC layer 21 and the switchable birefringent layer 23 (both 90° twist).

The resulting transmission (after multiplication with the eye sensitivity function) in the bright and black states for the normally bright mode (Mode 1) and the normally black mode (Mode 2) is indicated in FIG. 5.

The contrast ratio for the normally bright mode is excellent, approximately CR=1000, but for the normally black mode the contrast ratio is only CR=50. Which mode is used for 3D and which is used for 2D may, as mentioned, be chosen arbitrarily.

Figure 6:
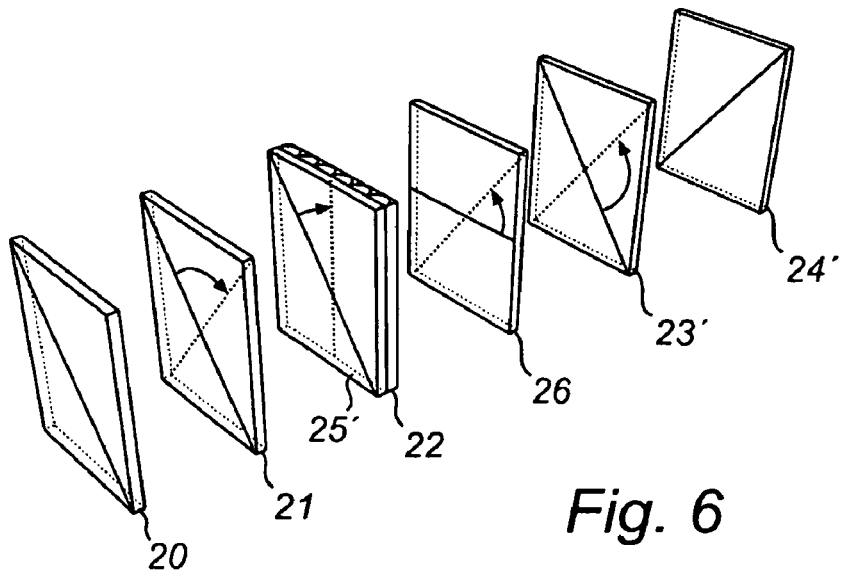
FIG. 6 illustrates schematically a switchable 2D/3D display according to an embodiment of the invention.

FIG. 6 illustrates schematically a switchable 2D/3D display according to an embodiment of the invention. The display device of FIG. 4 has then been modified to include a birefringent compensation layer 26. Moreover, the rotator layer 25' twists the polarisation of transmitted light in the opposite direction as compared to the rotator layer 25 in FIG. 4, although this change is not necessary. The polarisation directions of the switchable birefringent layer 23' and the front polariser 24' have also been changed accordingly. The birefringent compensation layer 26 is capable of compensating for any imperfect polarisation twist induced by the rotator layer 25. This means that for wavelengths where the polarisation has become elliptic due to the imperfect rotation of the rotator layer 25', this elliptic feature is removed by the compensating layer, since as a whole the equivalent birefringent effect for the two layers 25', 26 is zero. This is, in the embodiment in FIG. 6, due to the fact that the total twist is 0°, the retardation value $d\Delta n$ is the same for both layers, and that the rear optical axis of the birefringent compensation layer 26 is perpendicular to the front optical axis of the rotator layer 25 (horizontal and vertical, respectively, as indicated in FIG. 6).

This may be realised by ignoring the lens itself and dividing the rotating layers 25, 26 in thin segments. Then, the optically adjacent thin uniaxial segments of the birefringent compensation layer 26 and the rotator layer 25 can be removed, since their effects cancel each other. This can be done until the compensation layer 26 and the rotator layer 25 are removed completely.

The general inventive concept can be expressed as providing the birefringent compensation layer 26 with a polarisation change that is substantially equal in amount but opposite in direction, as compared to the polarisation change of the rotator layer 25, and preferably with approximately the same wavelength dependence.

This can be achieved to a great extent by letting the retardation value ($d\Delta n$) of the birefringent compensation layer 26 be substantially equal to the retardation value of the rotator layer 25.

Preferably, also the polarisation twist of the birefringent compensation layer 26 is made substantially equal in amount with the polarisation twist of the rotator layer 25, but opposite in direction.

Preferably also, the rear optical axis of the birefringent compensation layer 26 is arranged perpendicular to the front optical axis of the rotator layer 25'.

Each of these three measures provide per se improved contrast, but optimally all three are used.

In a preferred embodiment the same general concept may be applied to the pair of layers consisting of the LC layer 21 and the switchable birefringent layer 23'.

Thus preferably, the retardation value of the switchable birefringent layer 23' may be substantially equal to the retardation value of the LC layer 21. The polarisation twist of the switchable birefringent layer 23' may further be substantially equal in amount with the polarisation twist of the LC layer 21, but opposite in direction. Finally, the rear (towards the backlighting arrangement) optical axis of the switchable birefringent layer 23 may perpendicular to the front (towards the user) optical axis of the LC layer 21.

In the embodiment of FIG. 6, N=1 (for $\lambda$=550 nm) is preferably chosen for the rotator layer 25 ($\phi$=45°), and N=2 is chosen for the TFT LC layer 21 and the switchable birefringent layer 23' ($\phi$=90°). This determines for each of the layers the relation between d (layer thickness) and $\Delta n$ (the birefringence of the LC material) according to the Gooch-Tarry maximum.

Figure 7:
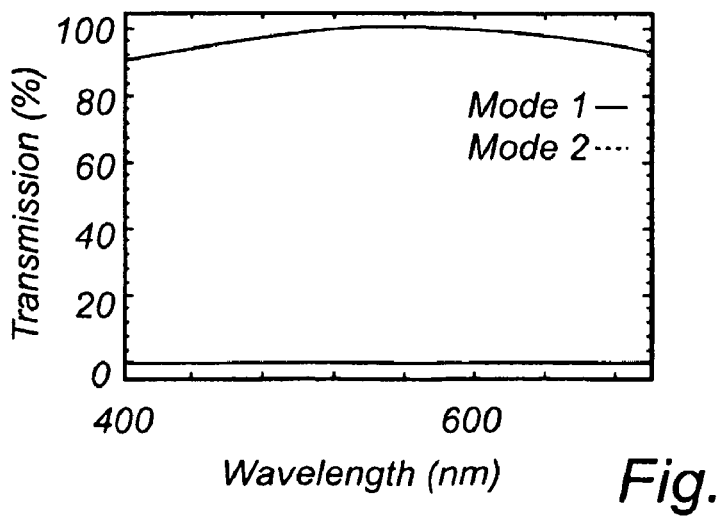
FIG. 7 illustrates simulated contrast ratio characteristics for the display of FIG. 6.

FIG. 7 illustrates simulated contrast ratio characteristics for the display of FIG. 6. As can be seen from FIG. 7 the contrast ratio is now excellent, and identical in both modes (the graphs coincide).

The invention is not limited to the above described embodiments, it may be varied within the scope of the appended claims.

For instance, even if the invention has been described in connection with a switchable 2D-3D display where different content may be displayed to the right and left eyes of a user, respectively, the display is equally usable as a general switchable dual view/single view display. Then, instead of displaying first and second images to the left and right eyes of a user, they are displayed in the directions of a first and a second user. Then e.g. the driver of a car may see driving related information, such as navigation information, when watching a display, while a passenger watching the same display at the same time for instance watches a movie.

In summary, the present invention relates to a display device with a birefringent lens system having cylindrical lenses, extending in a main direction. The polarisation of light modulated by a LC layer is twisted by a rotator layer in order to be perpendicular or parallel with this main direction. A birefringent compensation layer is used to remove any ellipticity introduced by the rotator layer. This provides improved contrast when the display device is used e.g. in a switchable 2D/3D display.

The invention claimed is:

1. A display device, comprising
   a controllable LC layer (21)
   a birefringent lens layer (22), comprising a number of cylindrical lenses, extending in a main direction, and a rotator layer (25') providing a polarisation twist for rotating the polarisation direction of light rays, received from the LC layer (21), in such a way that it is parallel with or perpendicular to the main direction, the lens layer (22) refracting said light rays differently depending on their direction of polarisation, and
   a switchable birefringent layer (23') receiving light rays from the lens layer (22) and providing a variable amount of polarising twist to these rays in order to select an operation mode for the birefringent lens layer (22),
   wherein a birefringent compensation layer (26) is placed between the birefringent lens layer (22) and the switchable birefringent layer (23'), the birefringent compensation layer (26) providing a polarisation change that is substantially equal in amount and is opposite in direction as compared to the polarisation change of the rotator layer (25').

2. A display device according to claim 1, wherein the retardation value of the birefringent compensation layer (26) is substantially equal to the retardation value of the rotator layer (25').

3. A display device according to claim 1, wherein the polarisation twist of the birefringent compensation layer (26) is substantially equal in amount with the polarisation twist of the rotator layer (25'), but opposite in direction.

4. A display device according to any of claim 1, wherein the rear optical axis of the birefringent compensation layer (26) is perpendicular to the front optical axis of the rotator layer (25').

5. A display device according to claim 1, wherein the retardation value of the switchable birefringent layer (23') is substantially equal to the retardation value of the LC layer (21).

6. A display device according to claim 1, wherein the polarisation twist of the switchable birefringent layer (23') is substantially equal in amount with the polarisation twist of the LC layer (21), but opposite in direction.

7. A display device according to claim 1, wherein the rear optical axis of the switchable birefringent layer (23') is perpendicular to the front optical axis of the LC layer (21).

8. A display device according to claim 1, wherein the switchable birefringent layer (23') has a plurality of individually controllable sub-areas.

9. A display device according to claim 1, wherein the display device is a switchable 2D-3D display and the main direction is approximately vertical as seen from a user.

* * * * *